Sept. 16, 1969 G. E. HARLAND, JR., ET AL 3,467,853
GENERATOR VOLTAGE REGULATING SYSTEM
Filed Sept. 19, 1967 2 Sheets-Sheet 1

INVENTORS
Glen E. Harland, Jr. &
BY Charles G. Hanson

C. L. Meland
ATTORNEY

Sept. 16, 1969   G. E. HARLAND, JR., ET AL   3,467,853
GENERATOR VOLTAGE REGULATING SYSTEM
Filed Sept. 19, 1967   2 Sheets-Sheet 2

INVENTORS
Glen E. Harland, Jr. &
BY  Charles G. Hanson

C. R. Meland
ATTORNEY

United States Patent Office 3,467,853
Patented Sept. 16, 1969

3,467,853
GENERATOR VOLTAGE REGULATING SYSTEM
Glen E. Harland, Jr., and Charles G. Hanson, Kokomo, Ind., assignors to General Motors Corporation, Detroit, Mich., a corporation of Delaware
Filed Sept. 19, 1967, Ser. No. 668,794
Int. Cl. H02h 7/06
U.S. Cl. 322—28    5 Claims

ABSTRACT OF THE DISCLOSURE

This invention relates to a transistor voltage regulator system for generators particularly of the type used to supply the electrical loads on motor vehicles. The regulator is designed so that it can be readily fabricated into a small integrated unit. The regulating system includes a circuit for varying the output voltage of the generator in response to changes in ambient temperature. The regulating system compensates for changes in the voltage characteristics of the semiconductor elements due to temperature change. The voltage regulator includes a resistor-capacitance circuit which forms a filter for the regulator. The capacitor of this circuit together with another resistor are operative to hold the output voltage of the generator up at high loads. The system includes a circuit for disconnecting the field circuit of the generator and regulator when the regulating system is not in operation.

---

This invention relates to a transistor voltage regulating system for generators and more particularly to a generator-voltage regulating system of the type that is utilized on motor vehicles.

One of the objects of this invention is to provide a transistor voltage regulating system which can be manufactured in a small integrated size but which is capable of regulating the output voltage of a battery charging generator on a motor vehicle.

Another object of this invention is to provide a transistor regulating system for a generator which is temperature compensated. In carrying this object forward a circuit is provided which varies the output voltage of the generator of the electrical system with changes in ambient temperature. A system is also provided which is capable of compensating for the changes in characteristics of the semiconductor elements such as transistors and Zener diodes which form a part of the voltage regulator.

Still another object of this invention is to provide a voltage regulating system that is used to regulate the output voltage of a diode rectified alternating current generator and which is operative to reduce the voltage droop normally associated with this type of power system at high loads. Thus, it is known that the output voltage of a polyphase bridge rectifier comprised of silicon diodes is a waveform that is comprised of the normal ripple associated with polyphase bridge rectifier networks upon which is superimposed a series of high frequency voltage spikes that are produced by diode ringing effects coupled with reactances. It is known that the high frequency voltage spikes increase in magnitude with increase in electrical load causing a high frequency switching rate of the transistor which controls field current. This produces a drooping output voltage characteristic with increase in electrical load and the system of this invention provides a filter network which makes the regulator insensitive to these high frequency voltage spikes and which therefore provides a system that has a smaller voltage droop with increasing load.

The filter network that has just been described preferably includes a capacitor which cooperates with a resistor which is connected in series with the output transistor of the voltage regulator and in series with the field of the generator. In the system of this invention the transistor switches on and off to control field current and because of this switching a square wave voltage is developed across the resistor. This square wave voltage is connected with the capacitor and the action of the resistor and capacitor is to reduce the slope of the voltage droop with increasing electrical load.

A further object of this invention is to provide a power supply system for a motor vehicle which includes a diode-rectified alternating current generator and a transistor regulator, the system including means for automatically disconnecting the field of the generator from the regulator when the system is not being used and including a temperature compensation system together with a system for holding up the output voltage of the generator with increasing electrical load.

Figure 1:
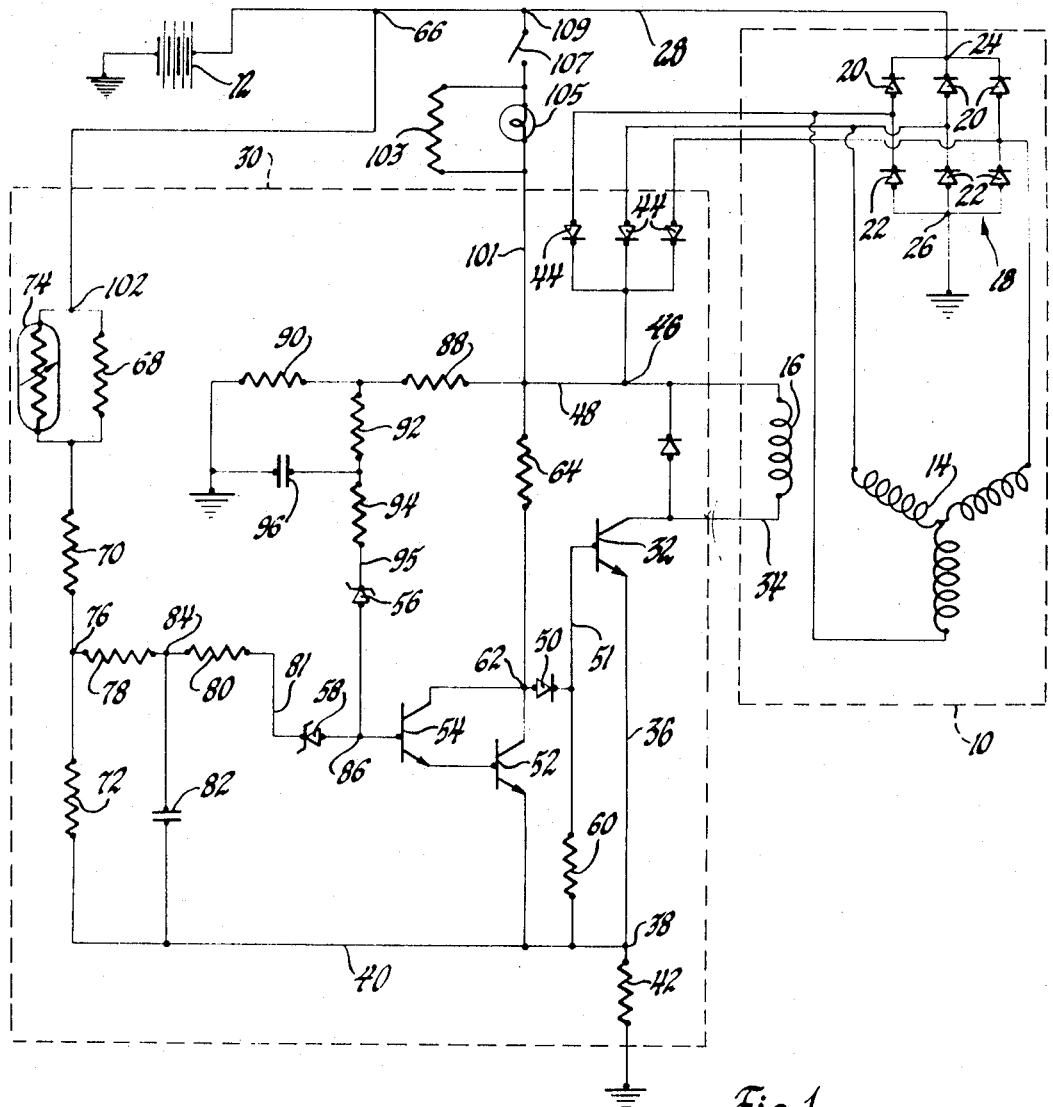
FIGURE 1 is a schematic circuit diagram of a generator-regulator system for supplying the electrical loads of a motor vehicle and made in accordance with this invention.

Referring now to the drawings and more particularly to FIGURE 1, the reference numeral 10 generally designates a source of direct current for supplying the electrical loads on a motor vehicle such as the battery 12. This source of direct current is an alternating current generator having a three phase Y-connected output winding 14 and a field winding 16. The output voltage of the output winding 14 depends upon the amount of current supplied to the field winding 16. The polyphase output winding 14 is connected with a three phase full wave bridge rectifier generally designated by reference numeral 18 and comprised of silicon diodes 20 and 22. The AC input terminals of the bridge rectifier 18 are connected with the output winding 14 and the bridge rectifier has direct current output terminals 24 and 26. The output terminal 26 is grounded while the output terminal 24 is connected with a battery cable 28 which is connected with the battery 12 which also serves to supply the electrical loads on the motor vehicle which are not illustrated.

The electrical system includes a voltage regulator generally designated by reference numeral 30 which is utilized to maintain the output voltage of the power source 10 substantially constant with varying engine speed and varying electrical load. The voltage regulator 30 is of the transistor type and as is more fully described hereinafter is preferably fabricated by an integrated circuit technique so as to be of extremely small size and therefore capable of mounting in or on the generator.

The transistor regulator 30 comprises an NPN output transistor designated by reference numeral 32. This output transistor can be fabricated by an integrated circuit technique and can be formed as a single chip of small size. The collector of transistor 32 is connected to one side of field winding 16 by a conductor 34. Where the field winding 16 is a rotatable part of the generator this connection is made by way of a brush and a slip ring. The emitter of transistor 32 is connected with conductor 36 which in turn is connected with junction 38 and conductor 40. A resistor 42 having a relatively small resistance connects the junction 38 to ground.

The filed circuit including the field winding 16 is supplied with current by auxiliary diodes 44 which are connected with the phase windings of the output winding 14 and with the AC input terminals of the bridge rectifier 18. From an inspection of the circuit it will be appreciated that the diodes 44 together with diodes 22 form a three phase full-wave bridge rectifier network and the output terminal 46 together with ground form field energizing direct current terminals. Thus, the field circuit will be energized from junction 46, through conductor 48, through field winding 16, through the collector-emitter circuit of transistor 32, through conductor 36, through resistor 42 and then through diodes 22 to the output winding 14 and to diodes 44. The conductor 48 can be connected to field 16 by a suitable brush and slip ring.

The transistor 32, as will be more fully described hereinafter, is continuously switched on and off to regulate the current in field winding 16 and its switching rate is determined by the output voltage of the generator. It will be appreciated that with this circuit a square wave voltage is developed across resistor 42 the purpose of which is to be described.

The output transistor 32 is biased conductive and non-conductive by a circuit which includes diode 50, NPN transistor 52, NPN transistor 54, Zener diode 56 and Zener diode 58. The components that have just been enumerated are formed as one integrated circuit chip in a manner to be described hereinafter.

The base of transistor 32 is connected with diode 50 by conductor 51 and a resistor 60 is connected across the base-emitter circuit of transistor 32. The base voltage of transistor 32 depends upon the output voltage of transistors 52 and 54. These two transistors have their collectors connected together at junction 62 and this junction is connected to conductor 48 by a resistor 64. The emitter of transistor 54 is connected to the base of transistor 52 and the emitter of transistor 52 is connected with conductor 40. When transistors 54 and 52 are both conductive current will flow between conductors 48 and 40 through resistor 64 which lowers the potential of junction 62 to a point where this potential is not capable of biasing the transistor 32 on and it therefore turns off. The voltage at junction 62 must overcome the forward voltage rating of diode 50 which is a forward biased PN junction and the base-emitter break down voltage of transistor 32 in order to bias transistor 32 conductive. When transistor 52 and 54 switch off the potential of junction 62 increases to a point where transistor 32 is biased fully on.

The conduction of transistors 52 and 54 is controlled by circuits including Zener diodes 56 and 58. The Zener diode 58 responds to the output voltage appearing between junction 66 and ground and this voltage represents the voltage being applied to the battery 12 from the direct current source 10. The voltage appearing between junction 66 and ground is sensed by a voltage divider comprised of resistors 68, 70 and 72, the resistor 68 being being connected in parallel with a thermistor 74 having a negative temperature coefficient of resistance. This voltage divider includes a junction 76 and the voltage developed across it is a representation of the voltage appearing between junction 66 and ground.

The junction 76 is connected in series with resistors 78 and 80, the resistor 80 being connected in series with Zener diode 58 by means of conductor 81. A capacitor 82 connects junction 84 with conductor 40.

When the output voltage of the generator exceeds the desired regulated value, which is somewhat above battery terminal voltage, the Zener diode 58 will break down to forward bias transistors 52 and 54 which in turn lowers the potential of junction 62. This causes the transistor 32 to turn off. When transistor 32 turns off the field current is reduced which reduces the output voltage of the generator and the Zener diode 58 will then resume its blocking characteristic. When this happens transistors 52 and 54 turn off which raises the potential of junction 62 to switch transistor 32 on. The transistor 32 therefore switches on and off to reguate field current and the output votage of the generator.

The junction 86 which forms the input to transistor 54 is connected with the other Zener diode 56 which is connected to resistor 94 by conductor 95. This Zener diode together with resistors 88, 90, 92, 94 and capacitor 96 form a voltage protection circuit which is capable of regulating the generator in the event that the voltage between junction 46 and ground rises to an abnormally high value. This can occur when the voltage applied to Zener diode 58 never exceeds its break down value which would cause the transistor 32 to be biased full on at all times. This can happen if voltage sensing conductor 100 becomes disconnected from junction 66 and in such a case the voltage divider would sense no voltage. This can also happen should battery cable 28 become disconnected from junction 24 and in such a case the voltage divider would sense only battery voltage which is lower than the desired regulated voltage for the system.

Since these low voltage conditions provide an abnormaly high voltage at junction 46 the Zener diode 56 will break down to turn transistor 32 on and off and the system will now regulate under the control of Zener diode 56.

Figure 5:
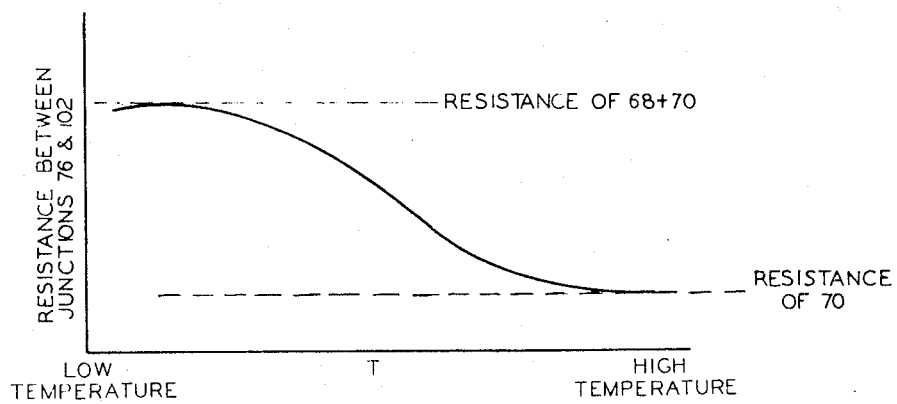
FIGURE 5 is a plot of the equivalent resistance of a voltage control network for the regulator versus temperature.

As pointed out above the resistor 68 is connected in parallel with the thermistor 74 and this arrangement varies the voltage response of the regulator to therefore change the output voltage of the generator with temperature change. The values of the resistance of the thermistor 74 and resistors 68 and 70 are selected such that the equivalent resistance that appears between junction 102 and junction 76 is as depicted in FIGURE 5. At the low temperature range, for example below 0° F., equivalent resistance across junctions 102 and 76 is substantially constant with changes in temperature and equals substantially the series resistance of resistors 68 and 70. At the high temperature range, for example above 160° F., the equivalent resistance remains substantially constant with changes in temperature and equals the resistance of resistor 70. In between these two extremes as shown in FIGURE 5 the equivalent resistance varies in a fairly linear fashion. The reason that the curve of resistance versus temperature takes the form shown in FIGURE 5 is that the resistance of resistors 68 and 70 changes very little with temperature. The thermistor 74 can have a negative temperature resistance coefficient of approximately 50,000 parts per million per degree centigrade at 25° C., greater than 50,000 p.p.m./° C. below 25° C. and less than 50,000 p.p.m./° C. above 25° C. At 25° C. the resistance of thermistor 74 is approximately 950 ohms. The resistance of resistor 68 is approximately 283 ohms and the resistance of resistor 70 is approximately 642 ohms.

The effect of this temperature compensating network is to vary the voltage applied to the input of the regulator with changes in temperature. Thus, during the extreme low temperature condition the equivalent resistance between junctions 102 and 76 is increased which lowers the voltage of junction 76 relative to conductor 40 for a given output voltage of the generator and therefore increases the output voltage of power source 10. As the temperature increases the equivalent resistance between junctions 102 and 76 decreases to raise the potential of junction 76 for a given output voltage of the generator and therefore decrease the voltage output of generator 10.

The temperature responsive circuit would not be effective if some means were not provided for compensating for the changes in the voltage break down characteristics with temperature of the semiconductors used in the transistor regulator. In the regulator of this invention the voltage needed to turn on transistors 52 and 54 must be sufficient to break down the NP junction formed by Zener diode 58 and the two series connected PN junctions formed by the base-emitter circuits of transistors 54 and 52. This arrangement provides a temperature compensating effect because the voltage required to break down Zener diode 58 increases with temperature whereas the voltage required to break down the forward biased base-emitter junctions of transistors 54 and 52 decreases with temperature. Because of this arrangement the voltage required to break down the Zener diode and the base-emitter junctions of the two transistors does not vary substantially with temperature.

From the foregoing it can be seen that the regulator of this invention is capable of varying the output voltage of the generator with temperature but yet is fully compensated for temperature change in its semiconductor components.

The conductor 48 of the regulator is connected to a conductor 101 which in turn is connected with a parallel connected signal lamp 105 and resistor 103. These elements are connected in series with ignition switch 107 connected to junction 109 on conductor 28.

When the system is started switch 107 is closed and the field 16 is initially energized from battery 12 through resistor 103 and lamp 105. When the generator comes up to voltage, as when it is driven by the engine, the diodes 44 and 20 apply substantially equal potentials to opposite sides of lamp 105 which extinguishes the lamp. The lamp therefore operates as a malfunction indicator for the generator since it will light whenever the output voltage of the generator drops a predetermined amount.

Figure 4:
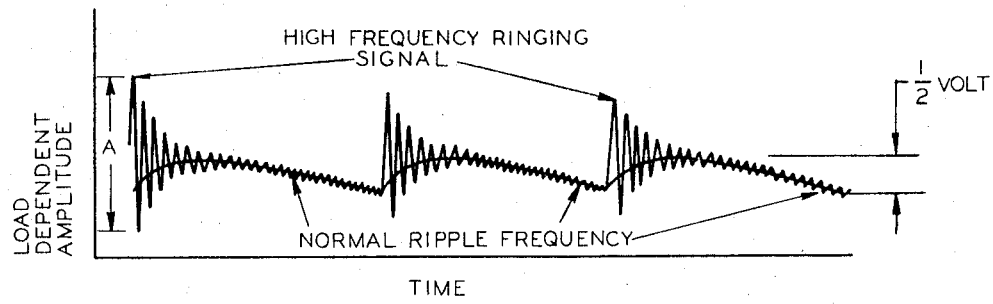
FIGURE 4 is a waveform representation of the output voltage of a polyphase bridge rectifier illustrating both the normal ripple frequency and high frequency ringing signal.

The output voltage waveform from the bridge rectifier 18, which is applied to junction 66 and ground and therefore to the input of the voltage regulator 30, is depicted in FIGURE 4. This voltage waveform includes the normal voltage ripple voltage and superimposed upon this ripple voltage is a load dependent high frequency ringing signal the amplitude of which is dependent upon the amount of current being supplied to the electrical loads by the system. This high frequency ringing signal produces three undesirable conditions in the operation of the system. The first undesirable condition is that the regulator will switch on each high frequency spike causing an excessive switching rate for output transistor 32 and an overheating of this transistor. The second undesirable condition which has been previously mentioned is that the output voltage of the generator will have a severe droop as the electrical load is increased. The third undesirable condition is that a flickering of the indicator light 105 may be caused.

To remedy the undesirable effects described above the regulator of this invention is provided with a filter comprised of resistor 78 and capacitor 82 which reduces the spikes supplied to Zener diode 58. This capacitor also operates in conjunction with resistor 42 to reduce the slope of the drooping output voltage characteristic of the system as the electrical load is increased. The resistor 78 and capacitor 82 operate as a filter but the capacitance of capacitor 82 is made small, as compared to filter capacitors used with discrete component regulators, in order that the integrated package may be kept as small as possible. Thus, where a discrete component regulator might use a filter capacitor of 10 µf., the filter capacitor for the system of this invention has a capacitance of approximately .047 µf. This is where the resistor 78 has a resistance of approximately 1,500 ohms.

As stated above, the capacitor 82 also operates in conjunction with resistor 42 to prevent a pronounced droop in the output voltage of the system with increased electrical load. The resistor 42 has a very low resistance in the magnitude of approximately .03 ohm and, as previously pointed out, because it is connected in series with the switching transistor 32 develops a square wave voltage. This means that potential of conductor 40 will vary between substantially ground potential and a potential of approximately .2 volt above ground in a square wave fashion due to the switching of transistor 32. When the potential of conductor 40 rises above ground potential the potential between junction 76 and conductor 40 will be reduced so that there is less voltage available to break down the diode 58 to switch off transistor 32. As the output voltage of the generator increases, due to the "on" condition of transistor 32, it will in time reach a value where Zener diode 58 breaks down. The time at which Zener diode breaks down will be delayed by the voltage across capacitor 82 since the voltage of junction 84 must be raised to a potential to break down Zener diode 58 and the rate of rise of this voltage is controlled by the charge rate of the capacitor 82. This time delay will be a function of the RC time constant of capacitor 82 and resistor 42 and the interaction of these two components, including the charging and discharging of capacitor 82, reduces the slope of the drooping characteristic of the output voltage with load. If the RC time constant is made large enough by increasing the resistance of resistor 42 or the capacitance of capacitor 82 the switching rate of transistor 32 can be reduced to the point where it does not switch on each ripple component of the output voltage. On the other hand the reduction of voltage droop can still be accomplished with the system of this invention by proper selection of the RC time constant for resistor 42 and capacitor 82 even where the regulator does switch with the ripple voltage.

Figure 2:
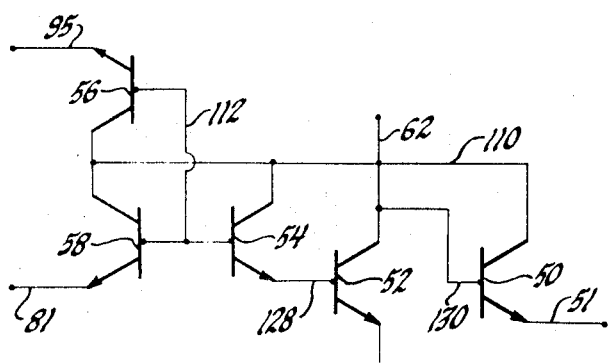
FIGURE 2 is a schematic circuit diagram showing certain components of the system of FIGURE 1 fabricated as an integrated chip.
Figure 3:
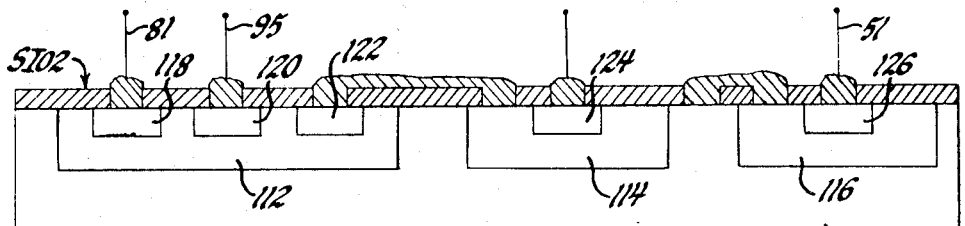
FIGURE 3 is a cross section of an integrated chip that forms the circuit of FIGURE 2.

Referring now more particularly to FIGURES 2 and 3, the method of integrating certain components of the voltage regulator is illustrated. In FIGURE 2 the same reference numerals have been used as were used in FIGURE 1 to identify the same semiconductor components. It can be seen from FIGURE 2 that Zener diode 56 is actually comprised of an NPN transistor utilizing its emitter-base junction and connecting its collector to a common block of N type semiconductor material designated by reference numeral 110.

The Zener diode 58 is likewise provided by the emitter-base junction of an NPN transistor and its collector is common to block 110. The transistors 54 and 52 have common collector connections and the diode 50 is provided by the base-emitter junction of an NPN transistor having another common collector connection.

The actual physical construction of the integrated driver chip is illustrated in the sectional view FIGURE 3. This integrated chip includes a block of N type semi-conductor material which forms the common collector for the various elements of the chip and which is again designated by the reference numeral 110. A plurality of zones or sections of P type material 112, 114 and 116 are diffused into the block 110. The emitters of the integrated chip are formed by diffusing a plurality of N type zones or sections 118, 120, 122, 124 and 126 into the P type zones or sections. The N type emitters 118, 120, 124 and 126 are connected respectively with conductors as shown and these are identified by the same reference numerals in FIGURES 1, 2 and 3. It will be appreciated from the foregoing that by use of a common collector of N type semiconductor material a single integrated chip is provided which forms two transistors 52 and 54, two Zener diodes 56 and 58 and one forward biased diode 50. The N type zone 122 is connected to the P type zone 114 by conductor 128 and the common N type material 110 is connected with the P type material 116 by conductor 130.

The N type material 110 is actually formed as a thin layer adjacent the P type material which has a resistivity of approximately 2.5 ohms-centimeter. The bulk of the N type material 110, or the portion connected with conductor 62, has a resistivity of approximately .01 ohm-centimeter. The block of material 110 can be considered as having an N type epitaxial collector with an N type substrate.

To give a brief description of the overall operation of the regulating system of this invention the ignition switch 107 is closed whenever it is desired to start the engine and set the electrical system into operation. When switch 107 is closed the field 16 will be initially energized by the battery 12 so that the generator will build up in voltage once it begins to be driven by the engine. The transistor 32, at this time, is biased conductive since the voltage divider including resistor 70 which is permanently connected across the battery senses battery voltage and this is lower than the voltage required to switch off transistor 32.

When the generator develops an output voltage which is equal to the desired regulated voltage the Zener diode 58 breaks down to switch transistor 32 off and then back on to regulate the output voltage of the generator by the switching action of transistor 32. When the desired regulated voltage is being maintained substantially equal potentials are applied to the opposite sides of indicator lamp 105 which causes the lamp to turn off. The lamp will not flicker during normal operation of the system because of the provision of the filter network previously described.

By way of example and not by way of limitation, the resistors and capacitors for the regulating system of this invention may have the following values in a 12 volt system:

| | | |
|---|---|---|
| Resistor 72 (Zener dependent) | ohms | 1500 |
| Resistor 70 | do | 642 |
| Resistor 68 | do | 283 |
| Resistor 78 | do | 1500 |
| Resistor 80 | do | 1500 |
| Resistor 64 | do | 85 |
| Resistor 60 | do | 105 |
| Resistor 88 (Zener dependent) | do | 2400 |
| Resistor 90 | do | 2500 |
| Resistor 42 | do | .03 |
| Resistor 94 | do | 1700 |
| Resistor 92 | do | 1000 |
| Thermistor 74 | ohms @ 25° C | 950 |
| Capacitor 82 | $\mu$f | .047 |
| Capacitor 96 | do | .0047 |

The resistance values for resistors 72 and 88 are approximate and their value will depend on the break down voltage of Zener diodes 58 and 56.

From the foregoing it will be appreciated that a voltage regulating system has been provided which can be formed as an integrated circuit and which is capable of varying the output voltage of the generating system with changes in temperature and which is also temperature compensated for changes in the characteristics of the semiconductor components that make up the regulator. In addition, the regulator includes a system for reducing the slope of the voltage droop of the generator with increasing load.

What is claimed is:

1. An electrical system comprising an alternating current generator having an output winding and a field winding, a bridge rectifier having direct current output terminals connected with said output winding, a transistor having emitter, collector and base electrodes, a first resistor, a field circuit for energizing said field winding from said generator connected with said generator and including in series connection said field winding, the collector-emitter circuit of said transistor and said resistor, a voltage divider connected across said direct current output terminals and developing a voltage which is a function of the output voltage of said generator, said voltage divider including a junction, a reference potential conductor connected to one end of said voltage divider, a switching circuit having an output coupled to the base of said transistor for biasing said transistor either fully off or fully on depending upon the output voltage of said generator, a Zener diode connected between said junction on said voltage divider and an input of said switching circuit, means connecting said first resistor between one of said direct current output terminals of said bridge rectifier and said reference potential conductor, a second resistor connected between said junction on said voltage divider and one side of said Zener diode, and a capacitor connected in series between said first and second resistors and across a part of said voltage divider, said first resistor and said capacitor providing means for reducing the slope of the voltage droop of said generator at high electrical loads and said second resistor and said capacitor forming a filter network.

2. An electrical system comprising, an alternating current generator having an output winding and a field winding, a polyphase rectifier means connected with said output winding having first and second direct current output terminals, a voltage regulator including a transistor having emitter, collector and base electrodes, said voltage regulator having a reference potential conductor, a first resistor connected between said reference potential conductor and said first direct current output terminal, a field circuit connected with said generator including in a series connection said field winding, the collector-emitter circuit of said transistor and said first resistor, a voltage divider connected between said second output terminal of said bridge rectifier and said reference potential conductor, said voltage divider having a junction, a switching circuit having an input and an output, a Zener diode connected between said junction on said voltage divider and said input of said switching circuit, said output of said switching circuit connected to the base of said transistor and operative to turn off said transistor when the output voltage of said generator exceeds a predetermined value and operative to turn on said transistor when the output voltage is below said predetermined value, a second resistor connected in series between said Zener diode and said junction of said voltage divider, and a capacitor connected between said second resistor and said reference potential conductor, said capacitor and said second resistor forming a filter circuit for said Zener diode and said capacitor and said first resistor providing a circuit that is operative to reduce the drooping voltage characteristic of said generator with increasing load.

3. An electrical system comprising, an alternating current generator having an output winding and a field winding, a polyphase bridge rectifier network comprised of a plurality of diodes having AC input terminals coupled to said output winding and having direct current output terminals, load conductor means connected with said direct current output terminals adapted to supply an electrical load, a plurality of auxiliary diodes connected with the AC input terminals of said bridge rectifier, a common terminal of said auxiliary diodes and one of said output terminals of said bridge rectifier forming direct current field energizing terminals, an output transistor having emitter, collector and base electrodes, means connecting the collector-emitter circuit of said transistor and said field winding in series across field energizing terminals, a voltage divider connected across said power supply conductors including a junction, a portion of said voltage divider comprising a parallel connected thermistor and first resistor connected between one of said power supply conductor means and said junction of said voltage divider, a second resistor connected in series between said junction and said parallel connected first resistor and thermistor, the effective resistance between said junction and said power supply conductor being substantially constant with temperature change at low and high temperature ranges and varying substantially linearly between said temperature ranges, a switching circuit including at least one driver transistor having a collector coupled to the base of said output transistor, a Zener diode, a third resistor connected with said junction on said voltage divider, means connecting said Zener diode between said third resistor and the base of said driver transistor, a capacitor connected across a part of said voltage divider in series with said third resistor, and a fourth resistor connected in series with said output transistor and in series with said voltage divider and capacitor, said fourth resistor and said capacitor providing a means for reducing the slope of the voltage droop of the output voltage of said generator with increasing electrical load, said third resistor and said capacitor forming a filter circuit for high frequency voltages spikes developed by the ringing of the diodes of said bridge rectifier network.

4. An electrical system comprising, a source of direct current including a generator having an output winding and a field winding, said source of direct current having first and second direct current output terminals, a voltage regulator including an output transistor and first and second driver transistors, said driver transistors having their collectors connected together and to the base of said output transistor, means connecting said field winding and the collector and emitter of said output transistor across said generator, means connecting the emitter of one of said driver transistors with the base of the other driver transistor, means connecting the emitter of said other driver transistor with a reference potential conductor, a voltage divider connected between said first direct current output terminal of said source of direct current and said reference potential conductor, said voltage divider having a junction, said voltage divider including a resistive circuit connected between said first direct current output terminal and said junction including a parallel connected first resistor and thermistor connected in series with a second resistor, said resistive network providing an effective resistance which is substantially constant with varying temperature in the low and high ends of a temperature range and decreasing substantially linearly with increase in temperature between said low and high temperature range, a filter network including a third resistor and a capacitor, a Zener diode, said third resistor and said Zener diode connected in series between the base of one of said driver transistors and said junction of said voltage divider, said capacitor connected between one end of said third resistor and said reference potential conductor, and a fourth resistor connected between said reference potential conductor and said second direct current output terminal of said power source, said fourth resistor and said capacitor forming a network for reducing the slope of the voltage droop of the output voltage of said direct current source with increasing electrical load, said resistive network varying the output voltage of said direct current source with changes in temperature.

5. An electrical system comprising, a source of direct current having first and second direct current output terminals and including a generator having an output winding and a field winding, a voltage regulator for said system including a power output transistor, said voltage regulator including a reference potential conductor, a first resistor connected between said reference potential conductor and said second direct current output terminal of said power source, a field energizing circuit connected across said generator including in a series connection said field winding and the collector and emitter electrodes of said output transistor, a pair of driver transistors, means connecting the collectors of said driver transistors together and to the base of said output transistor, means connecting the emitter of one of said driver transistors with the base of the other driver transistor, means connecting the emitter of said other driver transistor with said reference potential conductor, said output transistor being switched substantially fully conductive when said driver transistors are substantially fully nonconductive and vice versa, a voltage divider connected between said reference potential conductor and said first direct current output terminal, said voltage divider having a first junction, said voltage divider including a resistive network connected between said first direct current output terminal and said first junction, said resistive network including means for providing an equivalent resistance across said network which is substantially constant over low and high temperature ranges and which decreases substantially linearly with increase in temperature between said temperature ranges, a second resistor and a capacitor having a second junction, said second resistors and capacitor connected in series between said first junction of said voltage divider and said reference potential conductor, and a Zener diode connected between said second junction and the base of said first driver transistor, said first resistor developing a square wave voltage as said output transistor switches on and off.

References Cited

UNITED STATES PATENTS

| | | | |
|---|---|---|---|
| 2,895,059 | 7/1959 | Bell | 321—9 X |
| 2,943,281 | 6/1960 | Boyer | 322—32 |
| 3,098,964 | 7/1963 | Hetzler | 322—28 |
| 3,117,270 | 1/1964 | Tailleur | 321—18 X |
| 3,121,836 | 2/1964 | Rosenberry | 322—24 |
| 3,332,003 | 7/1967 | Hetzler | 322—73 X |
| 3,343,059 | 9/1967 | Kirk et al. | 322—72 X |

JOHN F. COUCH, Primary Examiner

S. WEINBERG, Assistant Examiner

U.S. Cl. X.R.

321—9, 18; 322—32